United States Patent
Sanders et al.

(10) Patent No.: US 8,032,415 B2
(45) Date of Patent: *Oct. 4, 2011

(54) IMMEDIATE RECOGNITION OF FINANCIAL TRANSACTIONS

(75) Inventors: William Thomas Sanders, Denver, NC (US); Daniel Christopher Bohen, Charlotte, NC (US); Shane Anthony Johnson, Charlotte, NC (US); Veralyn Dee Hensley, Folsom, CA (US); Amy Baker Folk, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/241,385

(22) Filed: Sep. 30, 2008

(65) Prior Publication Data

US 2010/0010904 A1    Jan. 14, 2010

Related U.S. Application Data

(63) Continuation-in-part of application No. 11/614,656, filed on Dec. 21, 2006, now Pat. No. 7,635,085.

(51) Int. Cl.
    *G06Q 20/00* (2006.01)
    *G06Q 40/00* (2006.01)
(52) U.S. Cl. ........... 705/16; 705/34; 705/35; 705/39; 705/44; 235/379; 235/380; 235/381
(58) Field of Classification Search ............ 235/379, 235/380, 381, 439, 491; 705/16, 35, 39, 705/44, 30; 726/5; 194/206, 229, 344
See application file for complete search history.

(56) References Cited

U.S. PATENT DOCUMENTS

| | | | |
|---|---|---|---|
| 4,542,287 A | 9/1985 | Watanabe | |
| 6,607,124 B1 * | 8/2003 | Junkins et al. | 235/379 |
| 6,848,612 B2 * | 2/2005 | Uematsu et al. | 235/379 |
| 6,983,836 B2 * | 1/2006 | Adams et al. | 194/302 |
| 7,014,105 B2 * | 3/2006 | Fujioka | 235/379 |
| 7,036,722 B2 * | 5/2006 | Fujioka | 235/379 |
| 7,213,745 B2 * | 5/2007 | Smith et al. | 235/379 |

(Continued)

FOREIGN PATENT DOCUMENTS

EP    1486923    12/2004

(Continued)

OTHER PUBLICATIONS

"BofA, Chase roll out major campaigns to boost ATM usage." Bank Marketing International Jul. 1, 2006: Banking Information Source, ProQuest. Web. Jul. 8, 2011.*

(Continued)

*Primary Examiner* — Matthew Gart
*Assistant Examiner* — Olusegun Goyea
(74) *Attorney, Agent, or Firm* — Banner & Witcoff, Ltd.; Michael A. Springs (57) ABSTRACT

Immediate recognition of deposits and other transactions may be provided by a financial institution for transactions conducted at a remote location. The financial institution may receive transaction data from a device at the remote location and immediately acknowledge the transaction and provide a non-provisional credit to an entity's account. The device may include various currency handling devices such as automatic teller machines (ATM), self-payment kiosks, cash registers and the like. A financial institution may further provide a real-time cash position of an entity across multiple currency handling devices of the entity.

15 Claims, 7 Drawing Sheets

U.S. PATENT DOCUMENTS

| | | | |
|---|---|---|---|
| 7,328,844 B2 | 2/2008 | Workens | |
| 7,350,699 B2* | 4/2008 | Gunst et al. | 235/379 |
| 7,481,360 B1* | 1/2009 | Ramachandran et al. | 235/379 |
| 7,523,856 B2* | 4/2009 | Block et al. | 235/379 |
| 7,681,707 B2* | 3/2010 | Tabachnik | 194/206 |
| 7,873,576 B2* | 1/2011 | Jones et al. | 705/43 |
| 2001/0020638 A1* | 9/2001 | Uematsu et al. | 235/379 |
| 2001/0054643 A1* | 12/2001 | Siemens | 235/379 |
| 2002/0011393 A1* | 1/2002 | Siemens | 194/215 |
| 2003/0061162 A1* | 3/2003 | Matthews | 705/41 |
| 2003/0080185 A1* | 5/2003 | Werther | 235/380 |
| 2003/0083969 A1* | 5/2003 | Uchiyama et al. | 705/35 |
| 2003/0191708 A1* | 10/2003 | Turk | 705/39 |
| 2003/0196936 A1 | 10/2003 | Graef et al. | |
| 2004/0039702 A1 | 2/2004 | Blair et al. | |
| 2004/0059634 A1 | 3/2004 | Tami et al. | |
| 2004/0107170 A1 | 6/2004 | Labrou et al. | |
| 2004/0153408 A1* | 8/2004 | Jones et al. | 705/43 |
| 2005/0049950 A1* | 3/2005 | Johnson | 705/35 |
| 2005/0080731 A1* | 4/2005 | Dnyaneshwar | 705/39 |
| 2005/0108164 A1* | 5/2005 | Salafia et al. | 705/42 |
| 2005/0278239 A1 | 12/2005 | Jones et al. | |
| 2006/0016884 A1* | 1/2006 | Block et al. | 235/381 |
| 2006/0022032 A1* | 2/2006 | Fillinger et al. | 235/379 |
| 2007/0005467 A1* | 1/2007 | Haigh et al. | 705/35 |
| 2007/0063016 A1* | 3/2007 | Myatt et al. | 235/379 |
| 2007/0240966 A1* | 10/2007 | Tabachnik | 194/206 |
| 2008/0149706 A1* | 6/2008 | Brown et al. | 235/379 |
| 2008/0265019 A1* | 10/2008 | Artino et al. | 235/379 |
| 2009/0166406 A1* | 7/2009 | Pigg et al. | 235/379 |
| 2009/0289105 A1* | 11/2009 | Block et al. | 235/379 |
| 2009/0320106 A1* | 12/2009 | Jones et al. | 726/5 |
| 2010/0010904 A1* | 1/2010 | Sanders et al. | 705/21 |
| 2010/0051687 A1* | 3/2010 | Jones et al. | 235/379 |
| 2010/0057617 A1* | 3/2010 | Jones et al. | 705/44 |
| 2010/0063916 A1* | 3/2010 | Jones et al. | 705/35 |
| 2010/0092065 A1* | 4/2010 | Jones et al. | 382/135 |
| 2010/0198708 A1* | 8/2010 | Tabachnik | 705/30 |
| 2010/0299257 A1* | 11/2010 | Turk | 705/44 |

FOREIGN PATENT DOCUMENTS

| | | |
|---|---|---|
| EP | 1517274 A2 | 3/2005 |
| WO | 2005038623 | 4/2005 |

OTHER PUBLICATIONS

David Breitkopf. "Small Banks Seen Quickly Adopting Imaging at ATMs." American Banker Jun. 6, 2006,Accounting & Tax Periodicals, ProQuest. Web. Jul. 8, 2011.*

Will Wade. "Gauging the Long-Term Opportunities in Check 21." American Banker Oct. 31, 2003,Accounting & Tax Periodicals, ProQuest. Web. Jul. 8, 2011.*

Simon Bain Personal Finance Editor. "Delays in clearing will remain :[1 Edition]." The Herald Sep. 12, 1998, ProQuest Newsstand, ProQuest. Web. Jul. 8, 2011.*

Robert Heady. "Banks' check-holding policies still mostly a matter of whim." Denver Post (pre-1997 Fulltext) Dec. 9, 1990,Business Dateline, ProQuest. Web. Jul. 8, 2011.*

Non-Final Office Action for U.S. Appl. No. 12/559,993, mailed Jun. 15, 2010.

International Search Report and Written Opinion for International Application No. PCT/US2007/088650 mailed Sep. 16, 2008, 10 pages.

European Office Action for Application No. 7865976.0, mailed May 12, 2010.

First Office Action from The Patent office of the People's Republic of China mailed Jun. 28, 2010, 10 pages.

Search Report and Written Opinion for International Application No. PCT/US09/58772, mailed Sep. 30, 2010, 8 pages.

Non-final office action for U.S. Appl. No. 12/559,993 mailed Nov. 26, 2010.

* cited by examiner

IMMEDIATE RECOGNITION OF FINANCIAL TRANSACTIONS

CROSS-REFERENCE TO RELATED APPLICATIONS

The present application is a continuation-in-part of U.S. application Ser. No. 11/614,656, entitled "Commercial Currency Handling and Servicing Management," filed on Dec. 21, 2006, the content of which is incorporated herein by reference in its entirety.

BACKGROUND

Businesses and other organizations often require a supply of cash to fund transactions such as providing change for customer purchases. Typically, businesses must periodically reconcile funds received at the business's site with a backing financial institution. Thus, funds received at a business's site in the morning would not be credited to the business or other organization's account until close of business, once the physical funds reach the financial institution or at some other predefined time.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one aspect of the present disclosure, an end-to-end currency handling and servicing apparatus is provided to any cash-centric business or enterprise. In various embodiments, the method, apparatus, and system may provide real-time recognition of deposits and other transactions made at various currency handling devices at the cash-centric business or enterprise. Currency handling devices may include, but are not limited to, automated teller machines (ATMs), payment kiosks, self-checkout registers, employee operated cash registers, other point of sale systems and the like.

Each of the currency handling machines may be connected to a financial institution's network or infrastructure. In an embodiment, each deposit or withdrawal via the currency handling machine may be credited or debited real-time to a customer's account. In another embodiment, real-time non-provisional crediting and debiting of a customer's account may allow the customer to have immediate access to the customer's recent deposits and current balance for use in future transactions or for planning and forecasting.

In another aspect of the invention, a currency handling device may be placed in each of a business customer's stores or locations. The currency handling machines may be networked. Accordingly, a financial institution is able to track and/or collect cash position data from each of the currency handling machines to provide a real-time cash position of a business customer's stores or locations on a business-wide, individual store or individual device basis.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
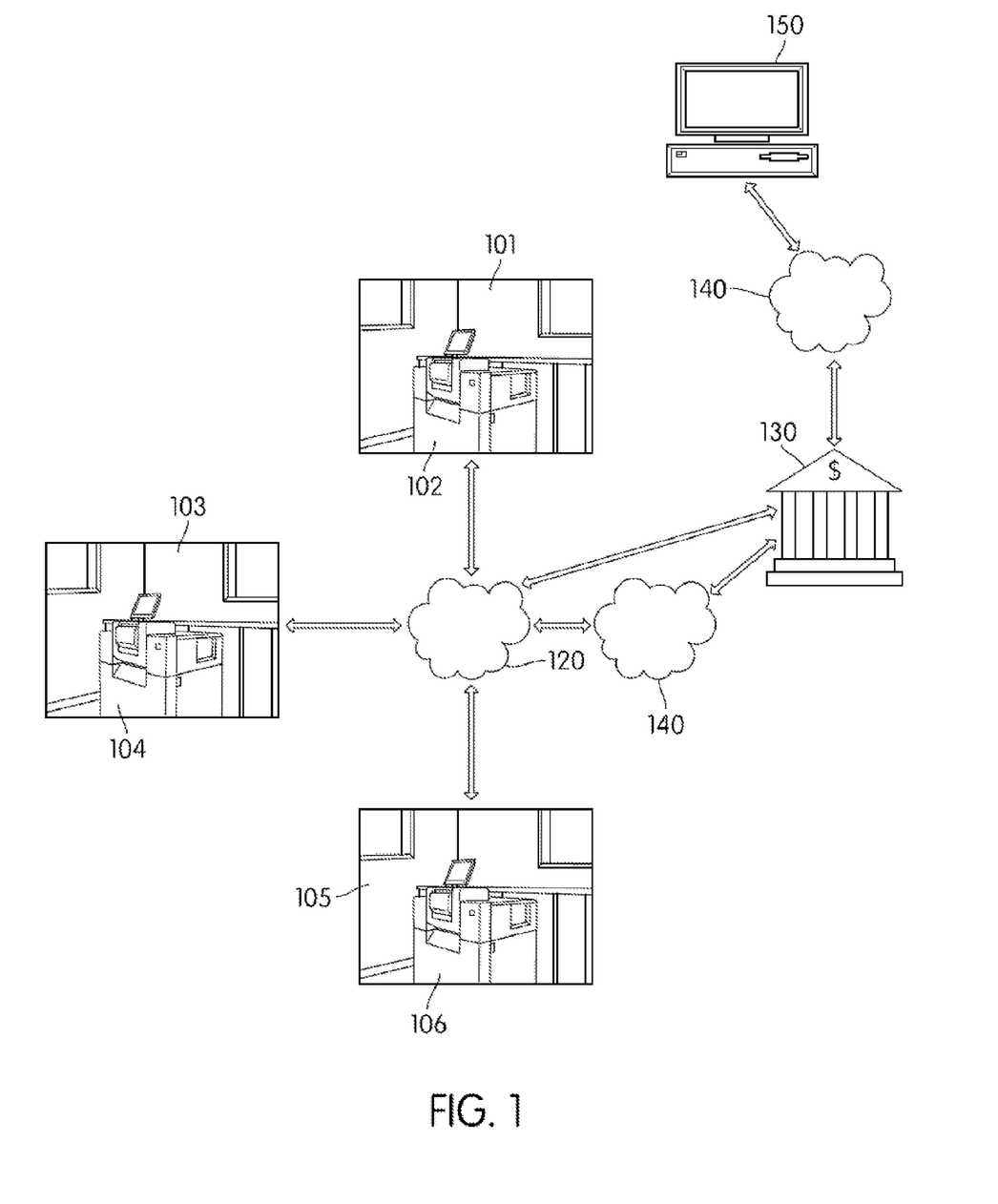
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
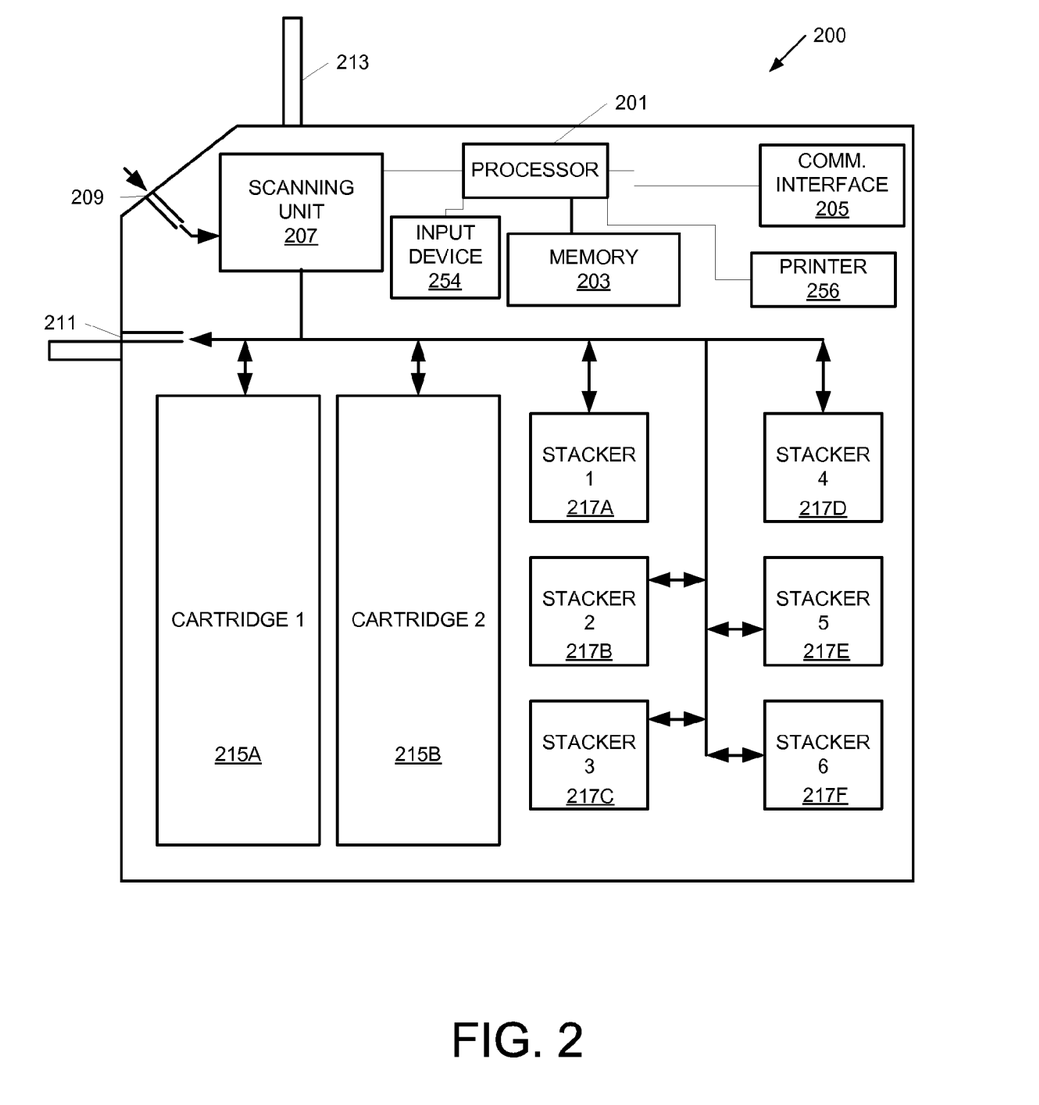
FIG. 2 illustrates a simplified diagram of a currency recycler in accordance with one or more aspects described herein.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and stackers 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
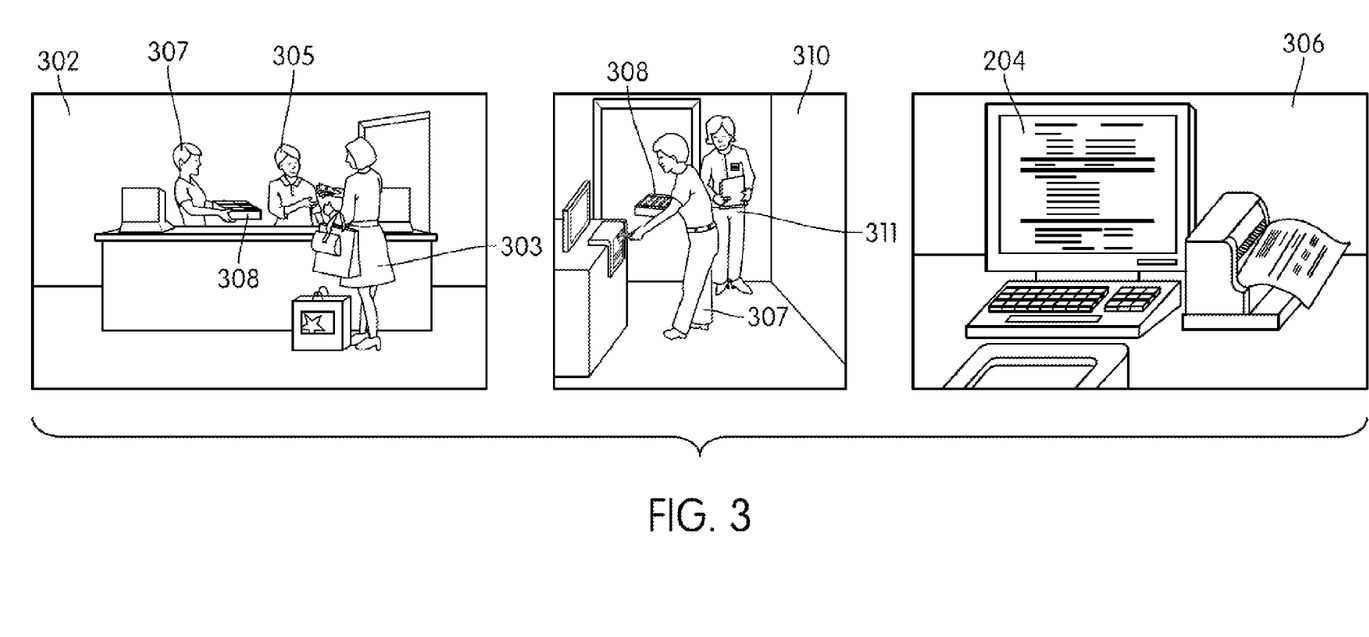
FIG. 3 illustrates various features of a currency recycler that may be used in accordance with one or more aspects described herein.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
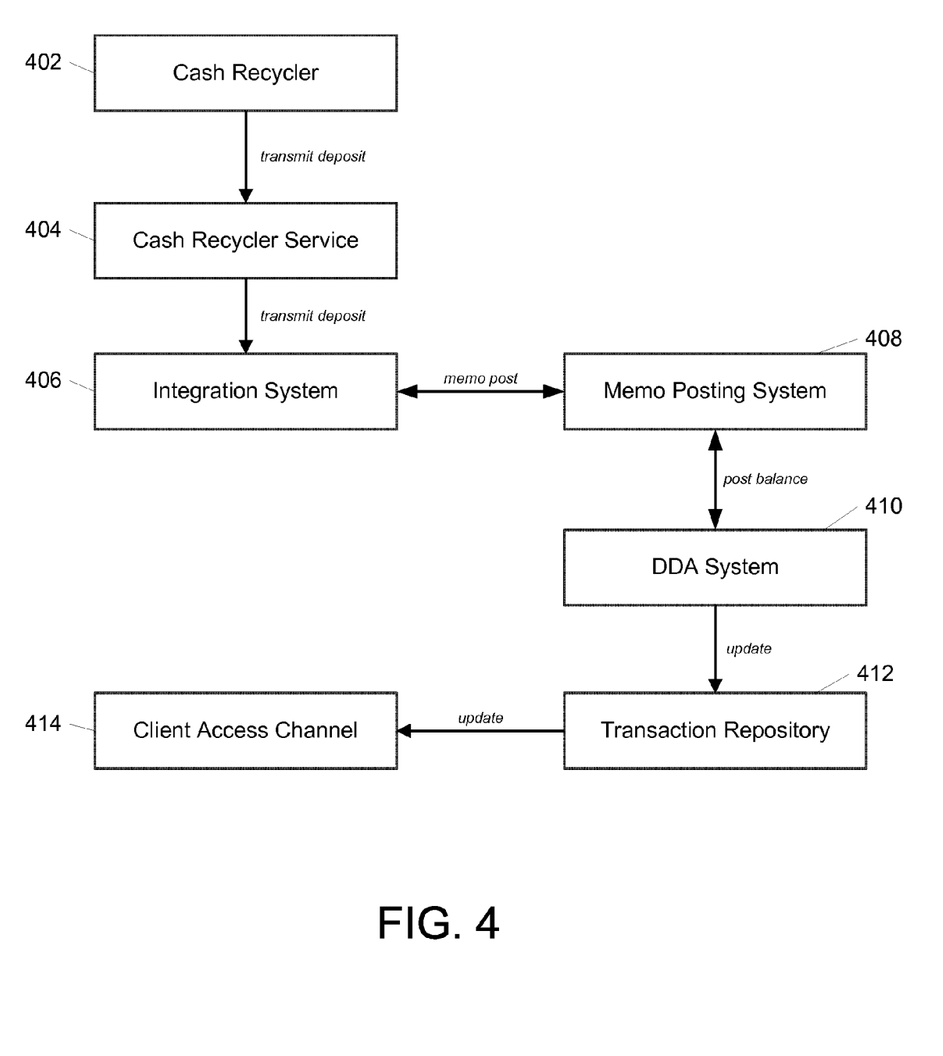
FIG. 4 illustrates additional features of a currency recycler used in one or more aspects described herein.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers many advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

As discussed, immediate recognition of funds may be provided by a currency handling device such as a cash recycler located in a back office of a business or other organization. However, prior to receiving recognition of funds, employees or other users must deliver the funds to the currency handling device. Thus, in retail situations, for example, where employees regularly receive and provide change at a point of sale such as a cash register, the employees must remove the funds from the register and deliver the funds to the currency handling device prior to receiving recognition for those funds.

Instead of moving funds from a point of sale system to a cash handling device to receive recognition of those funds, recognition may, alternatively or additionally, be provided at the point of sale system. Thus, once funds are deposited into a cash register, in one example, the deposit may be recognized in real-time by a financial institution holding an account of the retail business. Point of sale systems may include payment kiosks, cash registers, currency recyclers, vending machines and the like.

Figure 5:
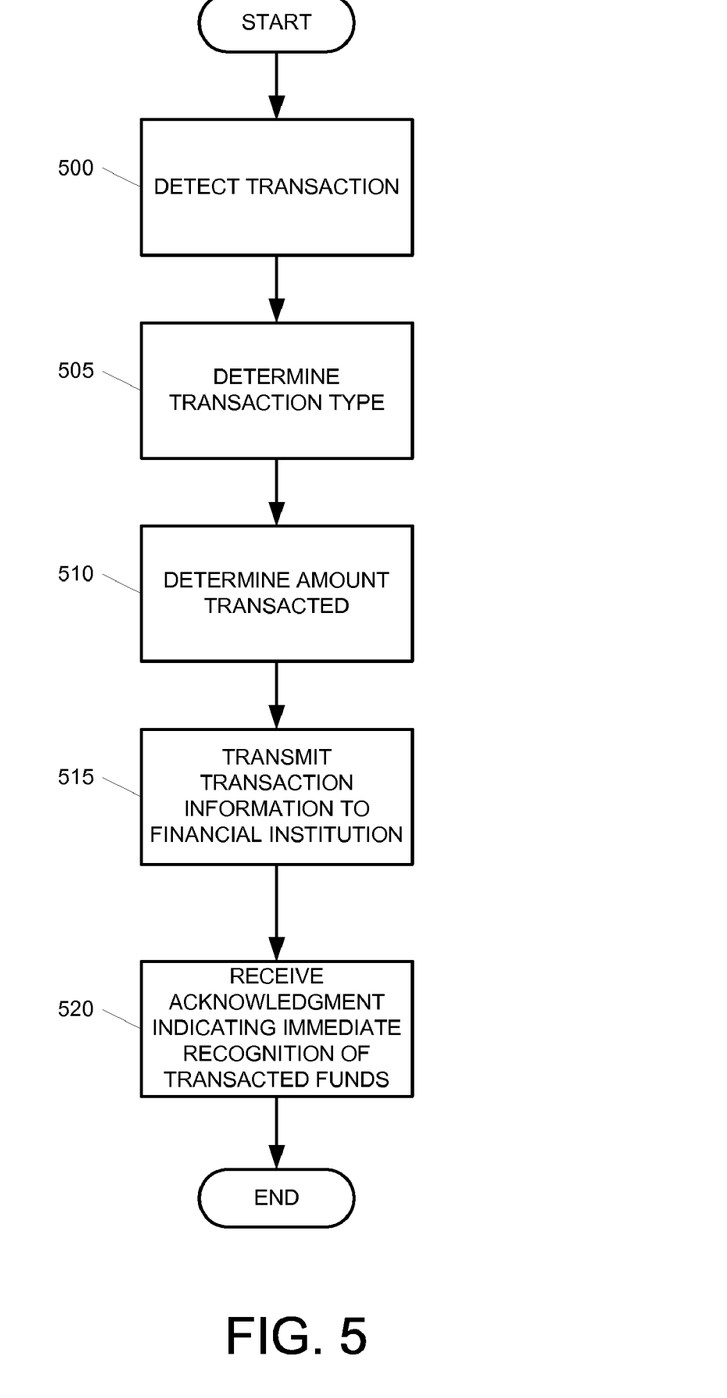
FIG. 5 is a flowchart illustrating a method for processing deposited currency at a point of sale system according to aspects described herein.

FIG. 5 illustrates a method for processing deposited funds at a point of sale system. At step 500, a point of sale device or system may detect that a transaction is being conducted. For example, a cash register may include a sensor that sends a signal when the register is being opened (i.e., signifying a transaction). In step 505, the device may determine a transaction type, e.g., whether the transaction is a deposit or a withdrawal. A weight sensor, for instance, may be used to detect if money is being withdrawn or deposited. Alternatively, the type of transaction may be determined based on a user selection. The point of sale system may subsequently determine the amount of currency transacted in step 510. Currency may be received from various parties. For example, if a point of sale device includes a cash register, it may receive currency from an employee. If the point of sale device is a self-service payment kiosk, on the other hand, the kiosk may receive currency from customers of a business or organization associated with the kiosk. In step 515, the point of sale system may transmit transaction information to a financial institution requesting recognition of the transaction. The request may be an explicit request or may be implicit based on transmission/receipt of the transaction information. The transaction information may include, for example, a deposit amount for deposit transactions or a withdrawal amount of withdrawal transactions, a transaction date and time, a location of the transaction identifying a device where the transaction is conducted (e.g., cash register, currency recycler, payment kiosk #2, etc.) and the like.

In one or more configurations, the transaction information may be transmitted through another cash handling device such as a currency recycler. For example, one or more point of sale recyclers may be wired or wirelessly connected to a central cash and/or coin recycler located in a back office. Throughout the day, financial transaction data may be transmitted in real-time to the central currency recycler that subsequently forwards that information on to the financial institution. Alternatively, the currency recycler may batch point of sale transactions and transmit them to the financial institution at various times of the day (e.g., once the number of batched transactions reaches a certain number or at a predefined time of day). In instances where transaction data may be transmitted in real-time to the central currency recycler, the funds in a point of sale device might not need to be reconciled with the back office (e.g., a cash room) at the end of a shift or day. Instead, funds may be extracted or added to the point of sale system periodically or aperiodically to insure that the denomination counts are within operational tolerances. Alternatively, the transaction information may be directly communicated to the financial institution from the transaction device.

In step 520, the point of sale may receive an immediate or real-time acknowledgment or confirmation from the financial institution indicating that the transaction has been recognized. Immediate and real-time processing or acknowledgment, as used herein, generally refers to the performance of a function without artificial or intentional delay. In particular, the financial institution may indicate that a deposited amount of currency has been non-provisionally credited to a specified account. The point of sale may also receive other information in the acknowledgment including a balance of the account, a total cash flow position of an entity to which the account belongs and the like. A cash flow position generally refers to an amount of physical currency available and on-hand. Thus, a retail chain may have hundreds of millions of dollars in its bank account, but only a few million of cash flow (i.e., currency on-hand) across its retail stores.

According to one or more aspects, instead of a financial institution transmitting real-time or immediate confirmations, confirmations may be batched and sent periodically or aperiodically throughout the day. This would allow a retail store or other client of the financial institution to still receive immediate credit without having to handle a constant stream of confirmations. That is, while credit is still given immediately for the deposit transactions made, a confirmation of the amount credited or other acknowledgment information might not be provided until a specified time and may be provided in a batch of confirmations. Additionally or alternatively, the financial institution may provide a confirmation that indicates a total amount credited over a specified period of time. If the client wishes to obtain further information or details regarding the amount credited, the client may request additional levels of detail such as transaction amounts on a individual transaction level, details of a particular transaction and/or transaction origins (e.g., register 9, employee 122, etc.).

Figure 6:
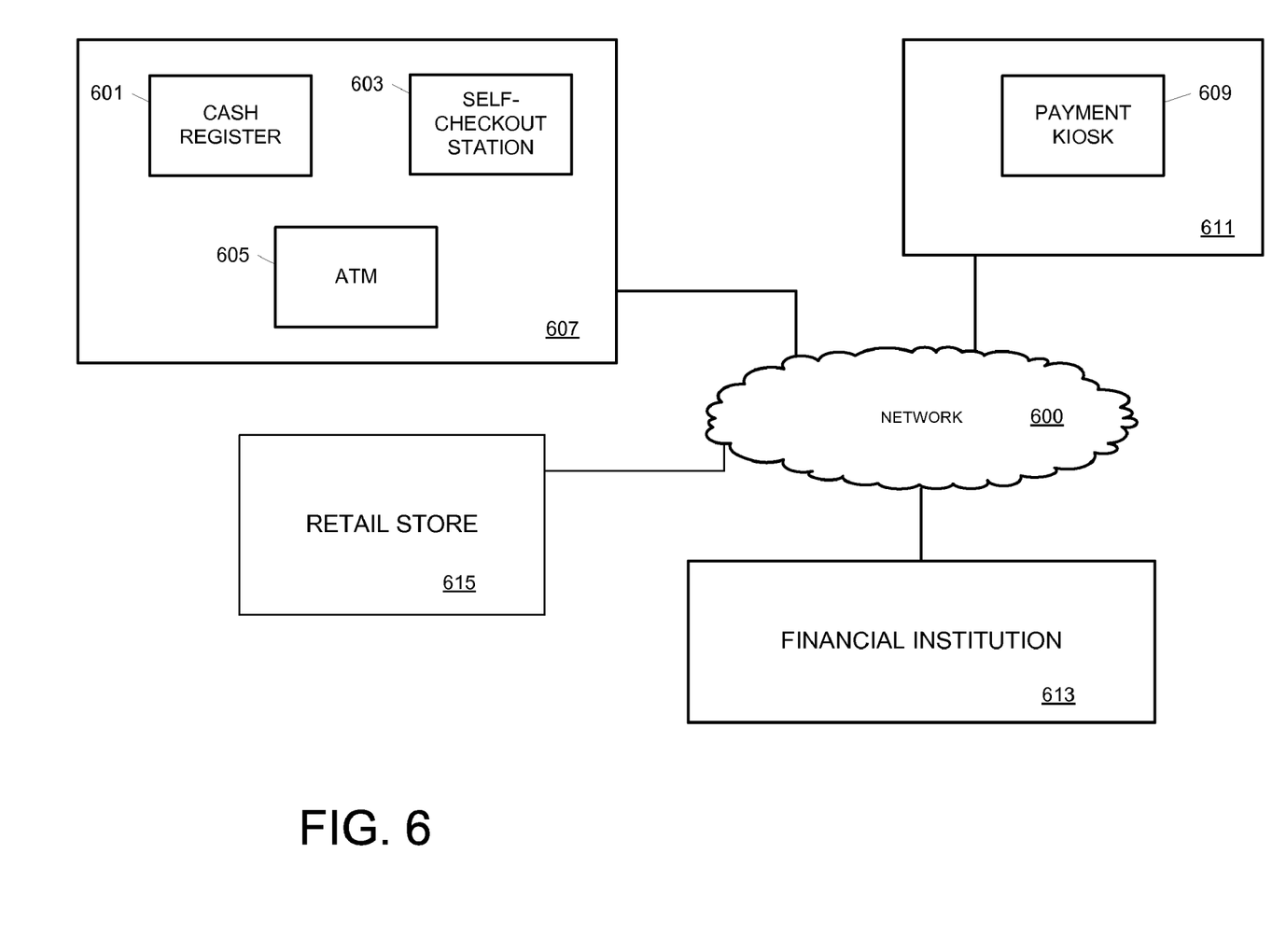
FIG. 6 illustrates an environment in which multiple point of sale systems and other cash handling systems may be used according to one or more aspects described herein.

FIG. 6 illustrates an environment in which multiple point of sale systems and other cash dispensing and transaction systems may be used. For example, an employee-operated cash register 601, a self-checkout station 603 and an automated teller machine (ATM) 605 may be located at a retail store 607 while a payment kiosk 609 may be located at a company 611 providing monthly subscription services such as a cable television services company. Each of devices 601, 603 and 605 at retail store 607 may be connected to a financial institution 613 through network 600. The financial institution 613 may hold an account of the retail store 607 that may be credited and debited based on transaction information received from devices 601, 603 and 605 through network 600. Similarly, in the scenario of the payment kiosk 609 located at company 611, payment kiosk 609 may transmit transaction data to financial institution 613 to credit or debit an account of company 611. Physical currency may periodically or aperiodically be delivered to financial institution 613 from the devices 601, 603, 605 or payment kiosk 609 using a transport carrier after the transaction has been recognized by financial institution 613.

Additionally, another retail store 615 of the same retail chain as retail store 607 may be connected to financial institution 613. Accordingly, retail store 615 may also receive real-time recognition of deposits and withdrawals by transmitting transaction data through network 600. Financial institution 613 may thus track the amount of physical currency available (i.e., cash position) at each of retail stores 607 and 615 as well as for the retail chain as a whole. The same cash position features may also be used for company 611 using payment kiosk 609.

Figure 7:
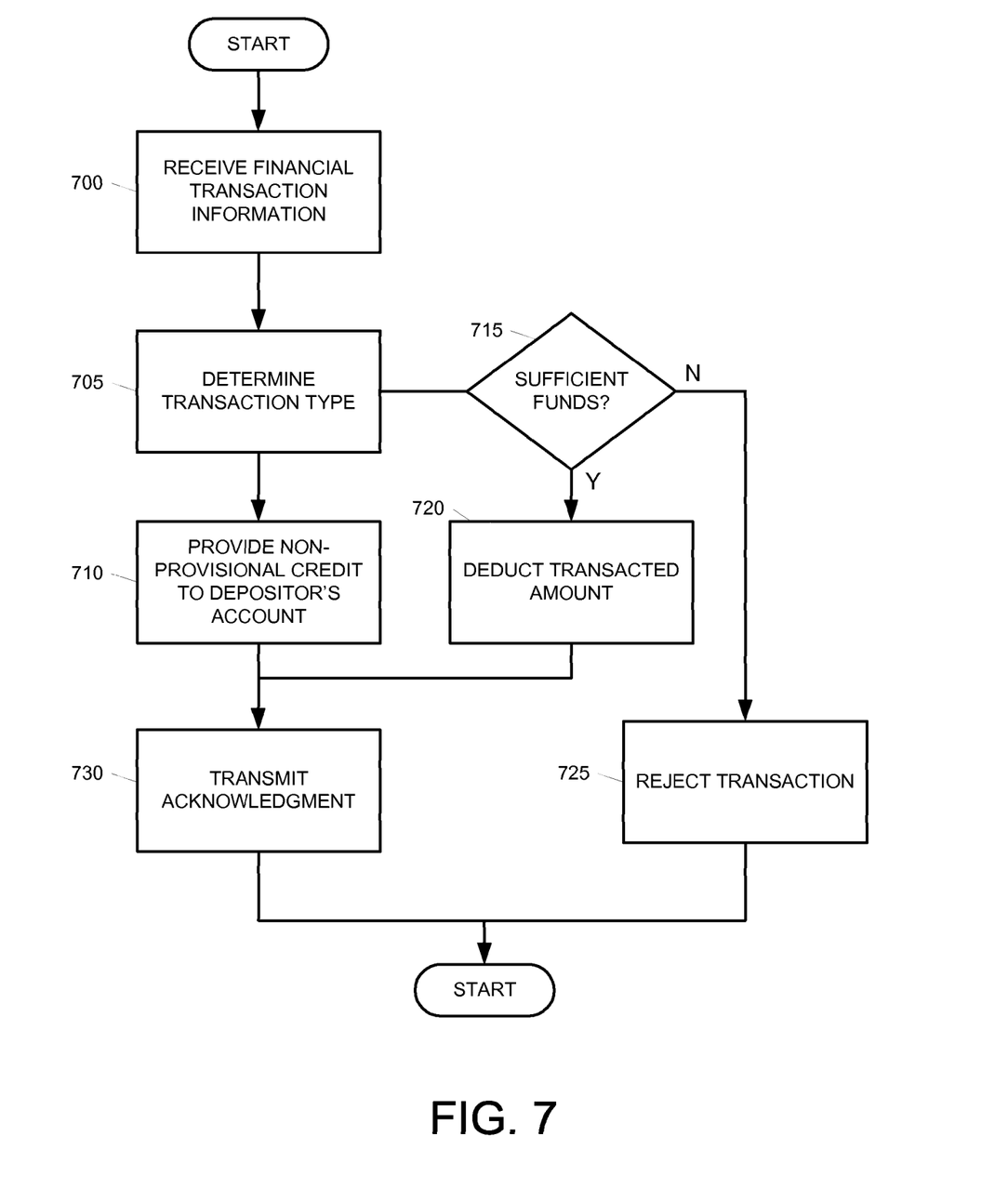
FIG. 7 is a flowchart illustrating a method for providing immediate recognition of transactions according to one or more aspects described herein.

FIG. 7 is a flowchart illustrating a method for providing immediate recognition of transactions. In step 700, a financial institution may receive financial transaction information from a currency handling device. The financial transaction information may be included in a request message seeking recognition of the transaction. For example, a point of sale device such as a cash register may transmit a request for non-provisional credit of a deposit transaction and include various details of the deposit, such as amount of deposit, account to which the credit should be made, and the like. In step 705, the financial institution may determine whether the transaction corresponds to a deposit transaction or a withdrawal transaction. Such a determination may be made using a transaction type identifier included in the transaction details. If the transaction corresponds to a deposit, the financial institution may provide a non-provisional credit to the depositor's account in step 710. In one or more arrangements, the financial institution may verify the authenticity of the transaction information based on data such as a transaction device identifier, a transaction number, an employee ID and the like. In step 730, the financial institution may transmit an acknowledgment of the transaction to the currency handling device. For a deposit, the acknowledgment may indicate that a non-provisional credit has been applied to the depositor's account for the amount deposited.

If, on the other hand, the transaction corresponds to a withdrawal transaction, the financial institution may determine whether an account from which the funds are being withdrawn includes sufficient funds in step 715. Sufficient funds may be defined based on a total amount of funds in an account, a total amount of funds plus a overdraft line of credit, a total amount of funds minus a minimum required balance and/or combinations thereof. If sufficient funds are available, the financial institution may deduct the transacted amount from the account in step 720. In step 730, the financial institution may transmit an acknowledgment to the currency handling device. On the other hand, if sufficient funds are not available in the account, the financial institution may reject the transaction request in step 725. In some arrangements, the financial institution will transmit an indication of the rejection to the currency handling device.

A point of sale system may determine an amount of funds transacted in a variety of manners. For example, a cash register may include a bill scanner such that a cashier would insert money through the bill scanner to make a deposit. The bill scanner may then determine a denomination of the currency being inserted into the point of sale system. Alternatively or additionally, a cash register or other point of sale system may have a weight sensor that is able to determine how much money is in a particular section of the system. In still other arrangements, a user may manually input the amount of funds transacted.

The methods and features described herein may be used with other cash handling devices such as automated teller machines (ATM), self-checkout systems, vending machines and the like.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements of the other embodiments. It will also be appreciated and understood that modifications may be made without departing from the true spirit and scope of the present invention. The description is thus to be regarded as illustrative instead of restrictive on the present invention.

We claim:

1. A method comprising:
    receiving, by a point of sale system associated with an entity, an amount of currency for a sales transaction between the entity and a customer of the entity;
    processing the sales transaction by the point of sale system;
    transmitting, by the point of sale system, deposit data including the amount of currency received to a financial institution in real-time, wherein the point of sale system is located remotely from the financial institution, wherein transmitting the deposit data includes requesting, from the financial institution, a non-provisional credit of the amount of currency into a financial account of the entity; and
    receiving an immediate acknowledgment from the financial institution indicating that non-provisional credit of the amount of currency has been provided to the financial account of the entity, wherein the non-provisional credit corresponds to a non-conditional credit.

2. The method of claim 1, wherein the point of sale system is a payment kiosk.

3. The method of claim 1, wherein the point of sale system is a cash register.

4. The method of claim 1, further comprising determining the amount of currency by determining a weight of the currency and a location in which the currency is deposited.

5. The method of claim 1, further comprising determining the amount of currency by scanning the amount of currency received in the transaction.

6. The method of claim 1, further comprising receiving data identifying a real-time cash position of the entity across multiple point of sale systems associated with the entity, wherein the data includes information separately identifying an amount of physical currency stored in each of the multiple point of sale systems.

7. The method of claim 1, wherein the deposit data and the non-provisional credit request are transmitted through a currency recycler different from the point of sale system.

8. An apparatus comprising:
a processor; and
memory operatively coupled to the processor and storing computer readable instructions that, when executed, cause the apparatus to perform a method comprising:
receiving, at the apparatus, an amount of currency for a sales transaction between an entity and a customer of the entity, wherein the apparatus is associated with the entity;
processing the sales transaction;
transmitting deposit data including the amount of currency received to a financial institution in real-time, wherein the apparatus is located remotely from the financial institution, wherein transmitting the deposit data includes requesting a non-provisional credit of the amount of currency received to a financial account of the entity; and
receiving an immediate acknowledgment from the financial institution indicating that non-provisional credit of the amount of currency has been provided to the financial account of the entity, wherein the non-provisional credit corresponds to a non-conditional credit.

9. The apparatus of claim 8, further comprising a currency scanner for determining the amount of currency received.

10. The apparatus of claim 8, the method further comprising determining the amount of currency by determining a weight of the currency and a location in which the currency is deposited.

11. The apparatus of claim 8, the method further comprising receiving data identifying a real-time cash position of the entity across multiple point of sale systems associated with the entity, wherein the data includes information separately identifying an amount of physical currency stored at each of the multiple point of sale systems.

12. The apparatus of claim 8, wherein the deposit data and non-provisional credit request are transmitted through a currency recycler different from the point of sale system.

13. One or more non-transitory computer readable media storing computer readable instructions that, when executed, cause a point of sale system associated with an entity to:
receive an amount of currency for a sales transaction between the entity and a customer of the entity;
process the sales transaction;
transmit deposit data including the amount of currency received to a financial institution in real-time, wherein the point of sale system is located remotely from the financial institution, wherein transmitting the deposit data includes requesting, from the financial institution, a non-provisional credit of the amount of currency into a financial account of the entity; and
receive an immediate acknowledgment from the financial institution indicating that non-provisional credit of the amount of currency has been provided to the financial account of the entity, wherein the non-provisional credit corresponds to a non-conditional credit.

14. The one or more computer readable media of claim 13, wherein the computer readable instructions, when executed, further cause the point of sale system to receive data identifying a real-time cash position of the entity across multiple point of sale systems associated with the entity, wherein the data includes information separately identifying an amount of physical currency stored at each of the multiple point of sale systems.

15. The one or more computer readable media of claim 13, wherein transmitting the data and requesting the non-provisional credit includes transmitting a request for the non-provisional credit through a currency recycler system associated with the entity.

* * * * *